United States Patent [19]

Harvey et al.

[11] E Re. 30,005

[45] Reissued May 22, 1979

[54] METHOD FOR THE ELECTROLYTIC RECOVERY OF METAL EMPLOYING IMPROVED ELECTROLYTE CONVECTION

[75] Inventors: Walter W. Harvey, Bedford; Myron R. Randlett, Burlington; Karlis J. Bangerskis, Walpole, all of Mass.

[73] Assignee: Kennecott Copper Corporation, New York, N.Y.

[21] Appl. No.: 860,511

[22] Filed: Dec. 14, 1977

Related U.S. Patent Documents

Reissue of:

[64] Patent No.: 3,928,152
Issued: Dec. 23, 1975
Appl. No.: 515,513
Filed: Oct. 17, 1974

U.S. Applications:

[62] Division of Ser. No. 445,435, Feb. 25, 1974, Pat. No. 3,875,041.

[51] Int. Cl.[2] ..... C25C 1/12

[52] U.S. Cl. ..... 204/106; 204/108; 204/105 R

[58] Field of Search ..... 204/105 R, 106, 108, 204/256, 258, 265, 270, 273, 277, 288

[56] References Cited

U.S. PATENT DOCUMENTS

| | | | |
|---|---|---|---|
| 1,700,178 | 1/1929 | Porzell | 204/277 |
| 1,805,920 | 5/1931 | Muschler | 204/277 |

*Primary Examiner*—R. L. Andrews
*Attorney, Agent, or Firm*—John L. Sniado; Anthony M. Lorusso; Gary A. Walpert

[57] ABSTRACT

An electrodeposition method in which high quality metal such as copper is produced on a non-retentive cathode blank at a high current density. A predetermined close cathode-anode spacing and a gas bubble tube for continuously agitating the electrolyte across the face of the cathode enable effective use of high current densities to electrowin or electrorefine a metal such as copper.

Method includes maintaining anodes apart from cathodes at a predetermined close distance, optimally less than one inch face to face. Bubble tubes are positioned between cathode-anode pairs and are supported by bubble tube support members.

For electrowinning, anode is provided with a non-conductive extension on its base and non-conductive convection baffles at opposite edges of its faces. Baffles and extension prevent electrodeposition on unwanted areas of cathode. Baffles, close spacing, and bubble tubes cause desired convection of electrolyte throughout cell. In an electrorefining cell, convection baffles are positioned on vertical support members within the tank.

26 Claims, 10 Drawing Figures

METHOD FOR THE ELECTROLYTIC RECOVERY OF METAL EMPLOYING IMPROVED ELECTROLYTE CONVECTION

Matter enclosed in heavy brackets [ ] appears in the original patent but forms no part of this reissue specification; matter printed in italics indicates the additions made by reissue.

This is a division of application Ser. No. 445,435 filed Feb. 25, 1974, *now U.S. Pat. No. 3,875,041.*

BACKGROUND OF THE INVENTION

The present invention is directed to an electrolytic process and apparatus for recovering copper and other metals. The process and apparatus of the present invention are useful in both electrowinning and electrorefining.

In the present invention a high current density is employed to deposit metal on a cathode. In connection with the foregoing, the term "current density" is the ratio of current in amperes to the area of cathode in square feet and is expressed in ASF units.

The current density normally employed in prior art electrowinning process is about 21 ASF. Of course, it is well known in this art that an increase in current density decreases the time required for a given amount of copper deposition. The main obstacle preventing those skilled in the art from increasing the current density is the lack of a suitable convection system for the electrolyte. The process and apparatus of the present invention is directed to a convection system which permits the current density in an electrolytic deposition process to be increased, while at the same time minimizing the incremental consumption of electrical power. That system includes combination convection baffles and cathode guides on the anodes, or positioned in the tank, a predetermined close cathode-anode spacing, and a gas agitation means positioned below and between the faces of the cathode and anode.

A major benefit to be derived from the application of the method and apparatus of this invention is the elimination of electrical shorts due to contacts between anodes and cathodes. This beneficial feature greatly reduces the amount of "systems work" required in commercial practice to locate and correct electrical shorts.

At the outset it is emphasized that gas agitation in an electrolytic process for recovering metal is not novel. Indeed, there are many prior patents disclosing gas agitation means in deposition systems. The following patents fairly represent the state of the art.

U.S. Pat. No. 1,260,830 to F. E. Studt, entitled Electrolytic Deposition of Copper From Acid Solutions, relates to the electrolytic deposition of copper from acid solutions, wherein a means is provided to continuously agitate the electrolyte, particularly across the face of the anodes. The agitation is provided by a mixture of sulfur dioxide gas and steam. The purpose of the steam is to insure the correct temperature conditions. The pipes through which the mixture of steam and sulfur dioxide is carried contain perforations or nozzles arranged at such angles that the escaping gas and steam will tend to impinge angularly upon the faces of the anodes, so that the electrolyte will be continuously circulated and maximum agitation will occur across the anode faces.

U.S. Pat. No. 1,365,032 to W. E. Greenwalt, entitled Electrolytic Apparatus, uses a mixture of steam and a gas to provide agitation in an electrolyte cell for the deposition of copper.

U.S. Pat. No. 1,365,034 to W. E. Greenwalt, also entitled Electrolytic Apparatus, teaches the use of gas under pressure to agitate the electrolyte in electrolytic copper deposition. Gas under pressure is fed to a perforated hood, and the hood is rapidly rotated in the electrolyte to distribute the gas throughout the bottom of the electrolyte tank.

U.S. Pat. No. 3,412,004 to J. B. Winters, entitled Test Plating Equipment and Method, relates to a laboratory test electroplating apparatus in which an air or compressed gas distribution system is used to cause bubbles to assume random paths of travel through the electrolyte.

U.S. Pat. No. 3,503,856 to R. C. Blackmore, entitled Process for Controlling Electrodeposition, discloses various methods of agitation employed in the electrodeposition of metals.

By and large, however, the prior art methods for agitating the electrolyte have not provided a sufficient amount of convection of the electrolyte which would enable a significant increase in the current density with an attendant production of high quality copper or other metals. Moreover, the prior art agitation methods have not been applicable to electrorefining, because of the resulting suspension of anode slimes and the consequent deterioration of deposit quality.

In the prior art processes which employ non-retentive cathode blanks, the edges of the cathode blanks are masked with non-conducting or insulating material to prevent the metal being deposited on each face of the cathode from joining, which would make removal of the deposit from the cathode difficult. An important side benefit of the convection scheme of the present invention is that insulating edging does not have to be positioned on the edges of a non-retentive cathode in order to prevent the edges of the deposit on each face from joining.

Other important side benefits include guidance of the cathodes into correct position and prevention of electrical contacts between anodes and cathodes, once positioned in the cell.

SUMMARY OF THE INVENTION

The processes and apparatus of the prior art are significantly improved by the convection system of the present invention. The present invention includes close cathode-anode spacing, insulating convection baffles, and means for generating a sheet of gas bubbles between the cathodes and anodes. As a result, current density can be significantly increased while enabling lower power consumption with an attendant production of high quality metal. Since it is preferred to utilize a non-retentive cathode, starting sheets are unnecessary with the present invention. Significant economic advantages of the present invention are that it minimizes plant size, systems work, power consumption and metal inventories.

Accordingly, it is an object of the present invention to provide an electrodeposition method and apparatus which enable the electrodeposition of metal at current densities which are high in relation to the metal concentration, while producing metal of acceptable purity and mechanical integrity.

A further object of the present invention is to provide a novel method and apparatus for effecting vigorous electrolyte convection in an electrodeposition process.

A further object of the present invention is to provide an electrodeposition convection system which includes insulating convection baffles, close cathode-anode spacing and means for generating a sheet of gas bubbles between the cathode and anode faces.

A further object of the present invention is to provide an improved method and apparatus for electrorefining copper.

A further object of the present invention is to provide an improved method and apparatus for electrowinning copper.

DESCRIPTION OF THE PREFERRED EMBODIMENTS

The present invention is directed to a method and apparatus for depositing superior quality cathode metal from all conventional electrolytes, including those having a high concentration of sulfuric acid. The apparatus may be used in conjunction with several anode materials. By way of example, a lead-antimony anode is acceptable in the apparatus of the present invention. The cathode may be a starter sheet or a non-retentive cathode blank formed of a material such as stainless steel or titanium.

Although the present invention can be practiced with a starter sheet as a cathode, in one important embodiment of this invention, an elongate non-retentive cathode blank is used. At this point, it should be noted that non-retentive blanks have been employed in the prior art. However, a problem associated with the prior art use of these cathode blanks is that the edges have to be masked with an insulating material, to prevent the metal which deposits on each face from joining and thereby making removal of the metal deposited difficult.

Figure 1:
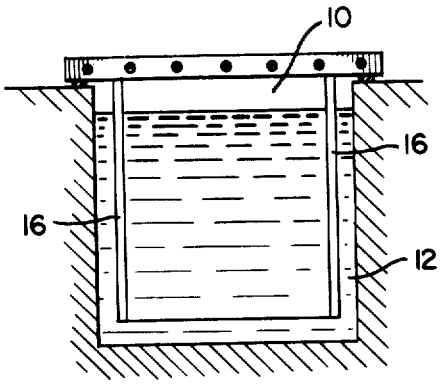
FIG. 1. (PRIOR ART)
FIG. 1 is a view of a prior art non-retentive cathode blank with an insulating edging applied thereto.

In connection with the foregoing, FIG. 1 shows a prior art non-retentive cathode blank 10 submerged in electrolyte 12. For clarity, the anodes and other structure normally associated with cathodic deposition are not shown in FIG. 1. When non-retentive cathodes are employed, the metal deposited thereon is removed after electrodeposition is complete. In order to permit such removal it is important that the layer of metal deposited on the two faces of the cathode do not join each other in the vicinity of the side edges. To prevent joining of the metal layers 14 and 15 on the side edges, insulating edging 16 is applied to the edges of the cathode blank 10. As a result of providing the cathode blank 10 with edging 16, there is no metal deposition on the cathode in the area of the blank covered by the edging. After the removal of the edging, a cathode containing two layers of deposited metal is produced. (See FIGS. 2 and 3).

Figure 2:
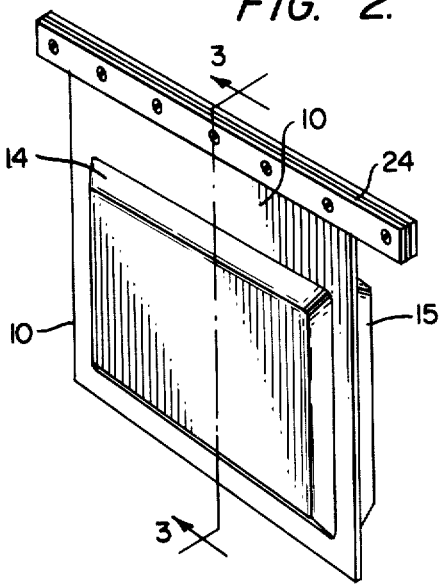
FIG. 2 is a perspective view of a non-retentive cathode blank having a layer of copper applied to both faces.
Figure 3:
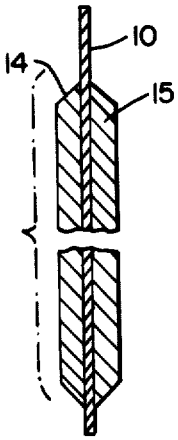
FIG. 3 is a sectional view taken along line 3—3 of FIG. 2.
Figure 9:
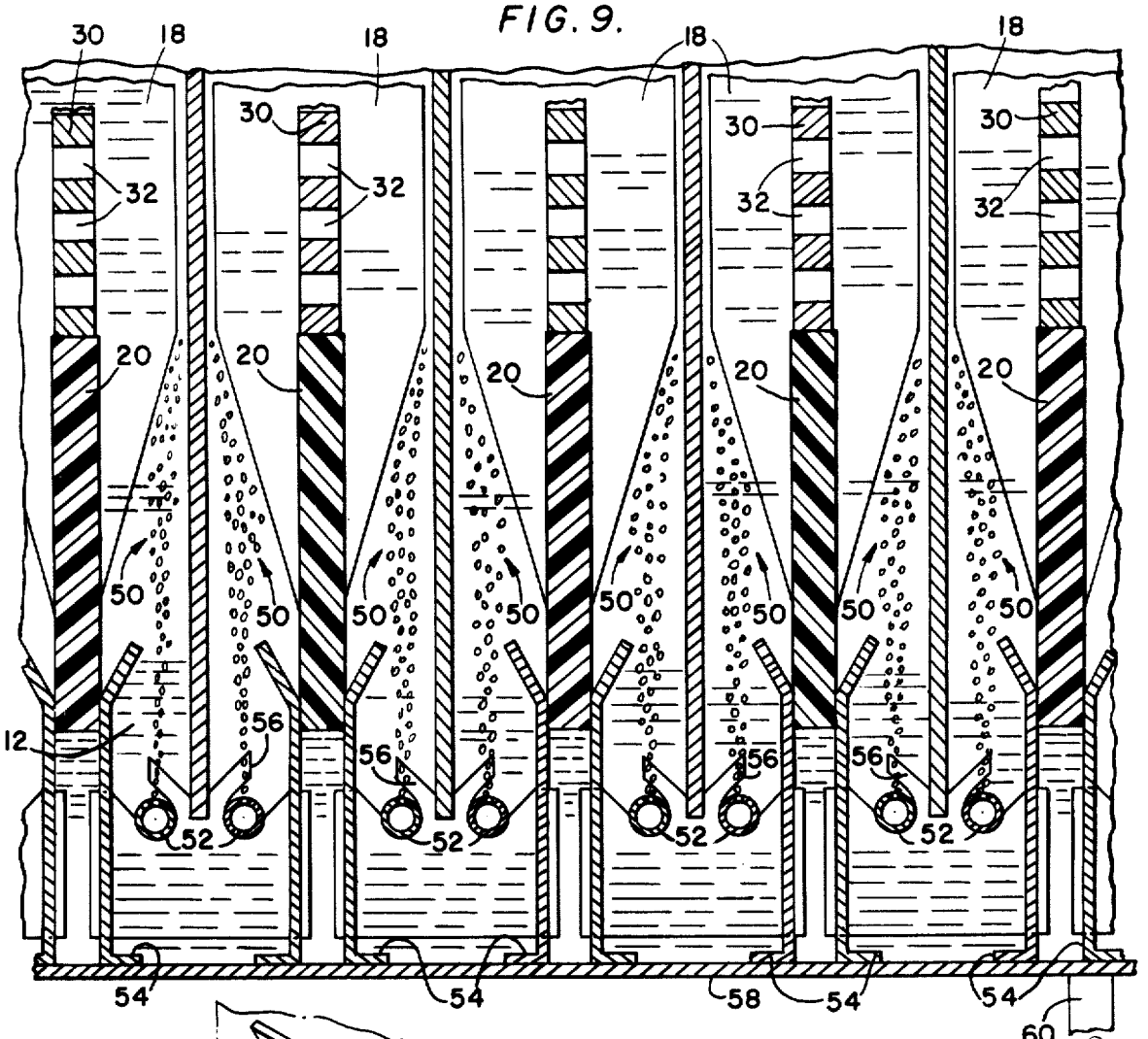
FIG. 9 is a sectional view taken along line 9—9 of FIG. 6.
Figure 10:
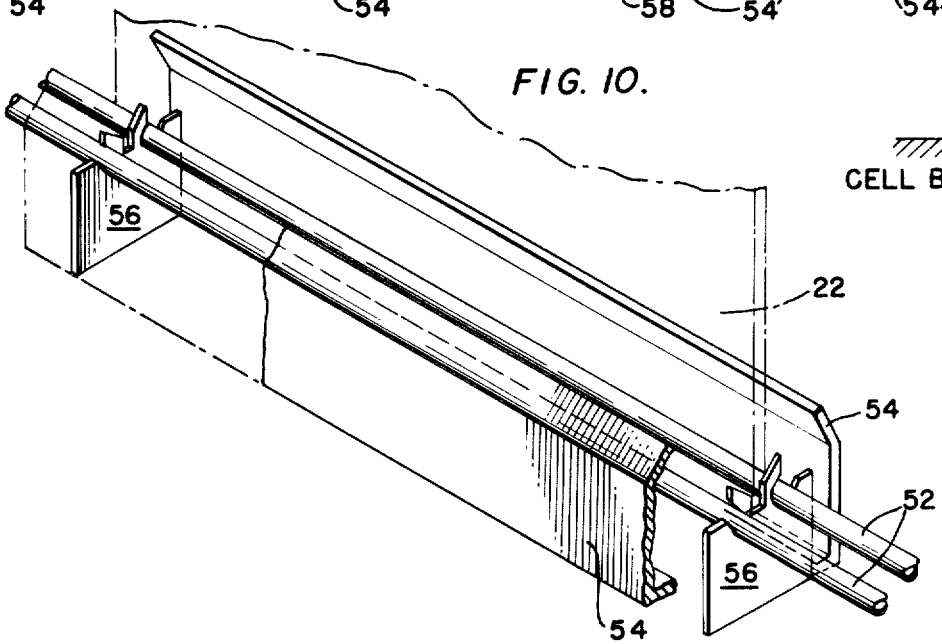
FIG. 10 is a perspective view of bubble tubes in a bubble tube support member.

By employing the apparatus of the present invention, no edging is required on the cathode; however, two sheets of metal similar to those shown in FIGS. 2 and 3 are, nevertheless, produced on the faces of the cathode blank. In the electrowinning embodiment of the present invention, electrodeposition on the edges of the cathode blank beneath the surface of the electrolyte is prevented by a combination of insulated convection baffles 18 located on the side edges of the insoluble anode and an insulated bottom extension 20 affixed to the bottom of the anode. The submerged length of the cathode blank is conveniently made equal to or somewhat greater than the submerged length of anode and its bottom extension, as illustrated in FIG. 9.

Figure 6:
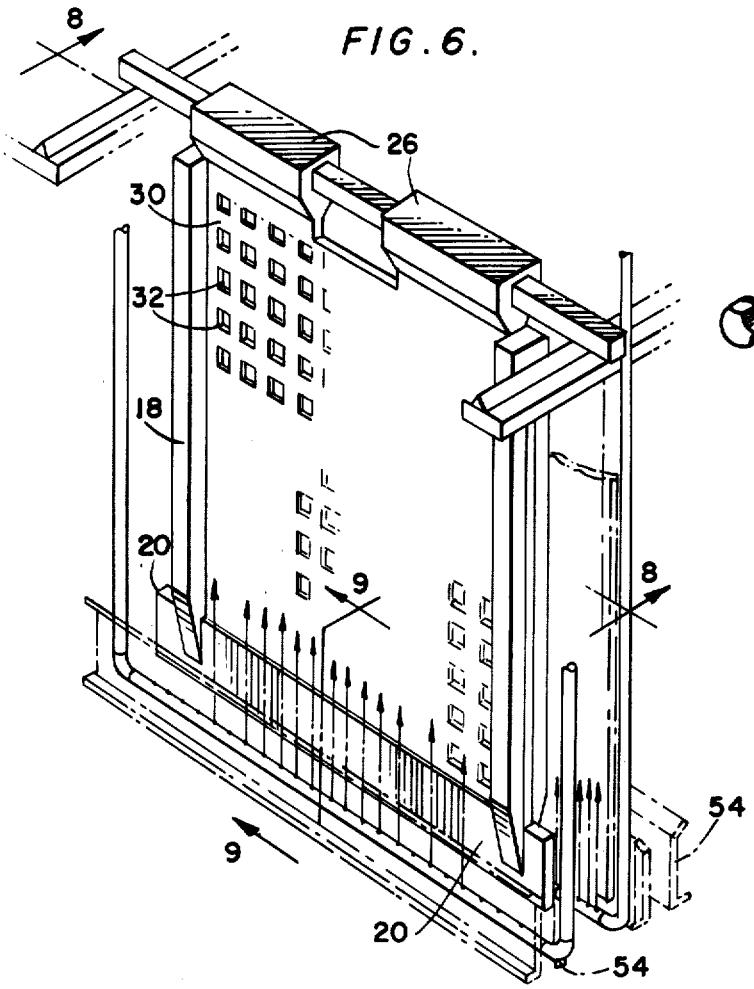
FIG. 6 is a perspective view of a portion of a cell showing an insoluble anode with insulating bottom extension and edge convection baffles.

In electrorefining, the anode extension is positioned on the bottom of the tank, with the anode positioned above it. The side baffles in an electrorefining cell may be positioned on a support member and affixed in the cell in relationship to the soluble anode. Side baffles 18 and bottom extension 20 for insoluble anodes are best shown in FIGS. 6 and 9. Details of how side baffles 18 and bottom extension 20 prevent the deposition of copper on the edges of the cathode and also prevent undesired deflection of the ascending gas bubbles are amplified at a more appropriate point in the specification.

Figure 4:
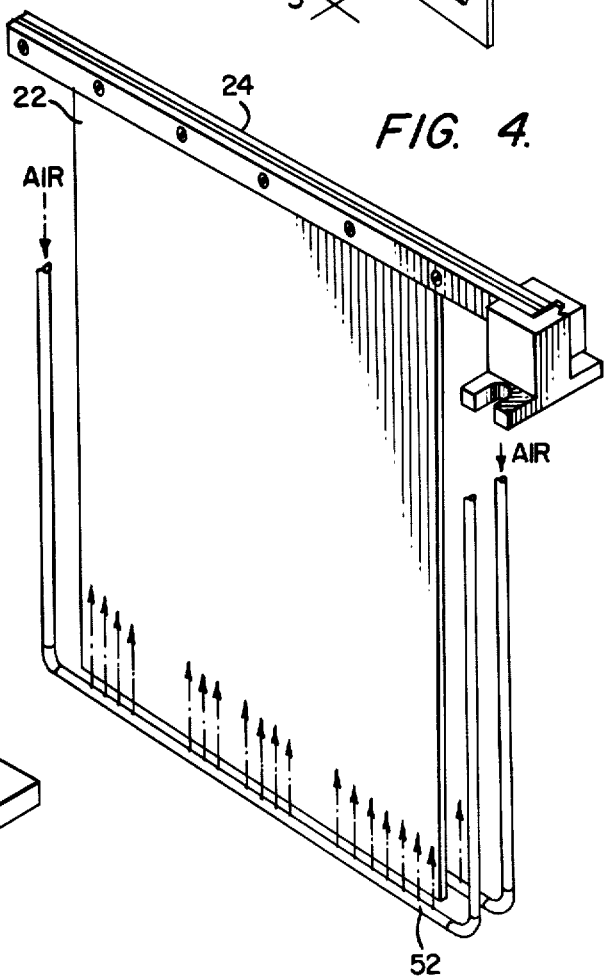
FIG. 4 is a perspective view of a non-retentive cathode and bubble tubes for forming a fluidized sheet of gas bubbles adjacent to both faces of the cathode.

FIG. 4 includes a perspective view of a non-retentive cathode blank 22, which is usable in accordance with the present invention. It is advantageous to form cathode 22 from Type 316 stainless steel having a standard 2B rolled finish. When this material is employed, no pre-treatment or break-in period is necessary for the cathode blank 22. Furthermore, it is easy to strip deposits from this cathode blank manually. Indeed, the deposits release easily from the cathode blanks 22 once the upper edges of the deposit are loosened. Deposits can also be detached by flexing the cathodes. It should be noted, however, that other materials can be employed in fabricating cathode blanks 22. For example, titanium blanks have been employed to advantage in the process of the present invention. Sheets of other conducting materials may be employed as cathode blanks, as appropriate to the nature of the metal to be deposited and the composition of the electrolyte.

Figure 5:
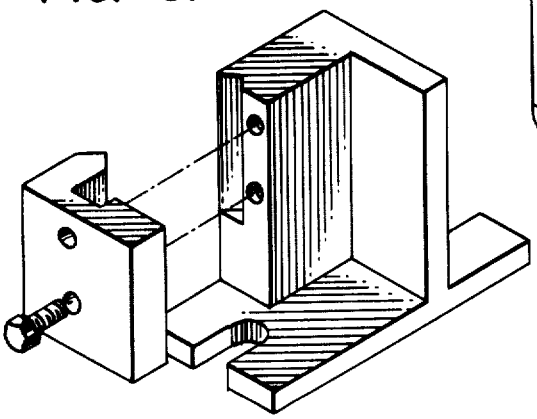
FIG. 5 is an exploded perspective view of the cathode clamps of FIG. 4, which are required only at very high current densities.
Figure 7:
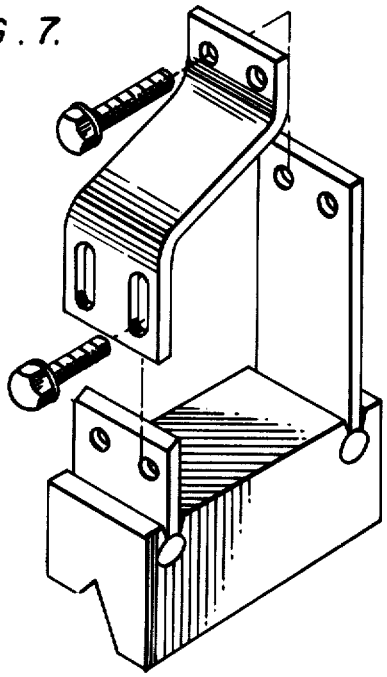
FIG. 7 is an exploded perspective view of an anode clamp particularly adopted for use with cast soluble anodes in very high current density electrorefining.

When the current carrying capacity of the contact between conventional triangular bar current conductor and electrode suspension bar is to be exceeded, it has been found effective to decrease the contact resistance by means of a very high current density contact clamp such as is illustrated in FIGS. 4, 5 and 7. Cathode suspension bar 24 is shown in FIG. 4 clamped at one end; depending upon the magnitude of the current density employed and the mode of conducting current between adjacent cells, the number of contact clamps required per electrode may be variously zero, one or two.

A sandwich arrangement similar to that illustrated in FIGS. 1, 2 and 4 is often used to suspend insoluble anodes. The second common suspension means for an insoluble anode consists of two integrally cast vertical lugs 26 enveloping sections of a rectangular suspension bar, which is usually of copper. (See FIGS. 6 and 8). The sandwich construction is preferred in the practice of this invention because it permits a closer approach of the anode face relative to the face of the cathode. In either case, contact clamps of the design detailed in FIG. 5 may be used with insoluble anodes, if desired.

Soluble anodes employed in electrorefining are typically cast with outwardly directed lugs, or ears of non-rectangular cross-section. The contact clamp detailed in FIG. 7 was designed for use in very high current density electrorefining by the method of the present invention. In general, contact clamps are superfluous at current densities of about 60 ASF or below; their use is strongly indicated at current densities of about 100 ASF and above. Clamps used in production could be alternatively weight-activated cam type or of other suitable design not requiring manual fastening.

Figure 8:
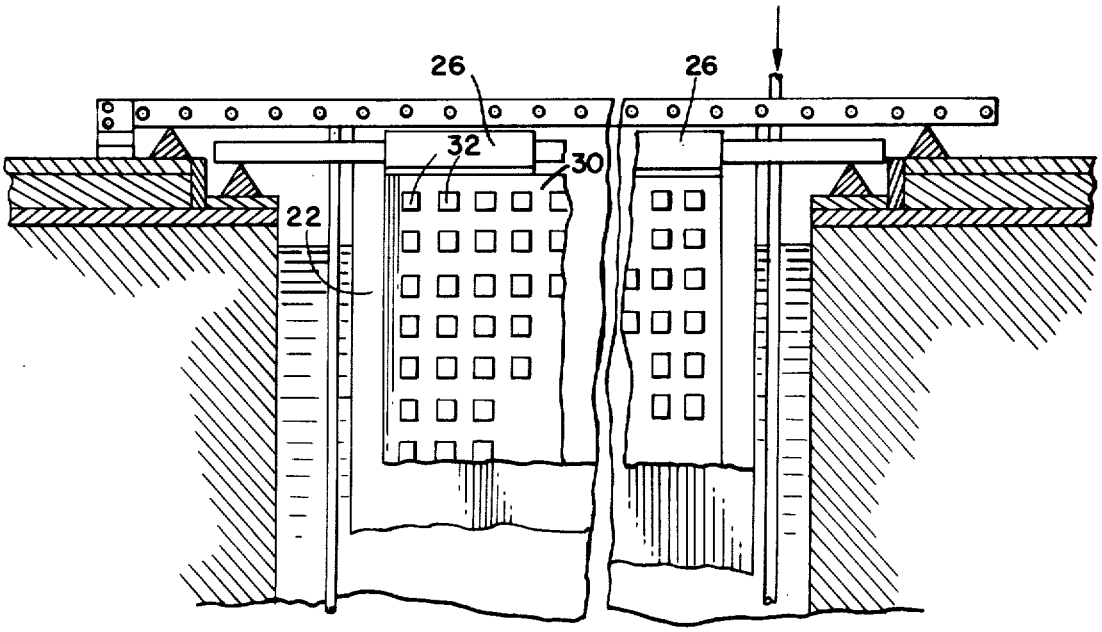
FIG. 8 is a sectional view taken along line 8—8 of FIG. 6.

FIG. 6 shows a perspective view of an anode 30 which is used in the present invention. Anode 30 is typically formed of a lead-antimony alloy. At this point, however, it is emphasized that the material from which the anodes are formed, forms no part of the present invention. In the electrowinning embodiment, anodes may be fashioned of any material of suitable electrochemical and mechanical properties. It is, of course, preferable for the most effective use of the invention that the anodes be rigid and of uniform cross-section. As is shown in FIGS. 6 and 8, anode 30 includes a plurality of holes 32. The square perforations are a design feature of a good quality insoluble anode, employed in conventional copper electrowinning, but afford no special advantages in the practice of gas agitation.

A significant feature of the anodes used in the present invention is the attachment of baffles 18 and extensions 20 thereto. Both baffles 18 and extension 20 are electrically insulating or non-conductive. They may be formed of any electrically non-conductive material which is relatively stable in the electrolyte environment. Extensions and baffles have been fabricated from a polyvinyl chloride polymer, which has been found better suited to this use than other insulating materials of construction, such as polyethylene, polypropylene and fiberglass-reinforced epoxy board.

As is shown in FIG. 9, edge baffles 18 form narrow passageways through which the ends of cathode blanks 22 project.

It is apparent to those skilled in the art that there will be no deposition of metal on the faces of the elongate cathode blanks for more than a short distance below the bottoms of the anodes. Furthermore, there will be no deposition on the faces of the cathode blanks at the area of the cathode faces which extend outwardly from the edges of baffles 18, due to the additional electrical resistance introduced. The convection baffles 18, thus, also functions as electrolytic current shields. Accordingly, with the arrangement of extensions 20 and baffles 18 on the anode or with the equivalent arrangement in the electrorefining embodiment, a sheet of copper is formed on each face of the cathode similar to those shown in FIGS. 2 and 3, but without the use of insulating edging. Confinement of the deposit spread to within the borders of the cathode faces has distinct advantages in that a. it eliminates time-consuming maintenance and replacement of insulating edging, b. facilitates removal of deposits from the cathode blanks and c. eliminates a source of contamination, namely the nodulose bead of deposit which typically forms along an edge strip. A further useful feature of the edge baffles of the present invention is that, with the anodes in place in the cell, the cathodes are thereby guided accurately into correct position relative to anodes and bubble tubes.

With the soluble anodes employed in electrorefining, it is generally not expedient to affix the convection baffles thereto. In that case, equally good results are obtained by positioning the side baffles in support members placed along the appropriate walls of the electrorefining cell. It is especially noteworthy that by using the technique and apparatus of the present invention, copper electrorefining was conducted at current densities as high as 210 ASF (i.e., ten times normal), without incurring passivation of the anodes. Passivation of the soluble anodes in conventional practice normally precludes electrorefining at high current densities.

As has been stated above, important features in the process and apparatus which enable efficient high current density operation are the reduced electrode spacing and a novel convection system. Convection of the electrolyte in the system of the present invention is powered by gas agitation. Gas agitation is an old technique in the electrodeposition art. In the present invention, the convection system produces a fluidized sheet of relatively small, rapidly ascending gas bubbles that, together with the turbulence they create, result in vigorous mixing at the cathode surface, where mixing is most needed. The convection system insures optimum deposition conditions such that the cathode is smooth and free of voids throughout all stages of its growth.

The gas agitation provides sufficient convection to prevent suspended particulates from lodging on the faces of the cathodes. Furthermore, the convection system avoids obstructions to electrolyte flow across the faces of the cathode and eliminates physical discontinuities of the cathode surface such as edging and loops which cause entrapment and accretion of solids. These features are particularly advantageous in the case of electrorefining, where large quantities of anode slimes are generated in the cell. It has been found that, contrary to the teaching of the prior art, the anode slimes can be disturbed to an appreciable degree without incurring enhanced incorporation of impurities into the cathode deposits. However, in order for this result to be achieved, the convection must be exceptionally vigorous and physical obstructions avoided, as is the case with the present invention. Similarly, in electrowinning, the present invention prevents incorporation of particulate impurities such as are derived from corrosion or erosion of the insoluble anodes. Thus, for example, electrowon copper of exceptional purity has been produced while employing conventional lead or lead alloy anodes in electrolytes which are corrosive to these anode materials.

The small bubbles 50 are propelled into the electrolyte 12 from bubble tubes 52 located beneath the electrodes 20 and 22 in the tanks. The air flow through the bubble tubes need not be large. For a ⅜ inch O.D. stainless bubble tube with 20/1000ths inch wall thickness, a suitable orifice diameter is 6/1000th inch (6 mils) at an orifice spacing of ½ inch. However, a less suitable bubbler configuration may be employed if the desired improvement in current density and deposit quality is not as great.

The most suitable configuration of the bubbler comprises a rigid tube with closely spaced (½ inch apart) round holes of diameter in the range of 5–7 mils. It has been found that bubble tubes having smaller diameter holes, e.g., 4 mils are not more efficient and are, moreover, more difficult to manufacture. It has also been found that bubble tubes with larger holes, e.g., 8 mils, expel an unnecessarily large volume of gas, or a comparable volume at a lower bubble velocity. If one bubble tube 52 is provided per cathode, as is shown in FIG. 9, an effective air flow is in the range of 3–4 SCFH per foot of cathode width or, for full-size cathodes, about 1.5–2.0 SCFH air per square foot of cathode. This flow volume is equivalent to the rate of oxygen generation at an insoluble anode at an anodic current density of 135 to 180 ASF. It has been found that it is not so much the volume of air expelled as the total bubble-tube/electrode configuration that determines the effectiveness of gas agitation. Lack of appreciation of this concept has probably retarded the more widespread application of gas agitation in large scale electrodeposition.

Although nitrogen has been used as the gas for agitation, air is preferred for reasons of economy whenever the ingress of atmospheric oxygen can be tolerated. When properly applied, air agitation becomes more, rather than less effective with decreasing electrode face to face separation, in contrast to other convection techniques known and practiced in the art.

To prevent the orifices from becoming crusted over with solidified solutes, the incoming air is presaturated with water vapor at a temperature close to that of the electrolyte. When this is done, the bubble tubes can be operated indefinitely without plugging of the orifices.

The invention finally provides that the electrode separation be at its practical minimum given the size of the electrode supporting means and the clearance required for inserting and withdrawing the cathodes. Together with the gas agitation, the reduced spacing provides the means of minimizing power consumption in the electrowinning or electrorefining process. The reduced spacing is maintained by a bottom rack 54 which is secured together by cross-members 58. Legs 60 attached to cross-members 58 support bottom rack 54 off the cell bottom. It will be clear that sufficient space must be provided at the sides and bottom of the cell to permit the electrolyte to circulate and to allow the slimes, if any, to settle out.

The bottom edges of the cathodes 22 are positioned in the electrowinning tank by the bubble tube support members 56 and are guided into position by the anode edge baffles 18. The anode end baffles also serve to confine the bubble flow to the volume of electrolyte immediately adjacent to the cathode faces, thereby effecting the necessary concentration depolarization and uniform mass transport of metal ions to the cathodes. The separation between the cathode blank or starter sheet and the insulating edge baffle is on the order of between about 1/16th to about ⅛th inch.

The gas agitation method of the present invention also has favorable consequences for the anode reaction. In particular, in the electrorefining embodiment, not only is anode passivation fully forestalled, but the soluble anodes are caused to corrode uniformly, thereby allowing a reduction in the amount of anode scrap. Improved efficiency is derived by substitution of soluble anodes having regular cross-section for the somewhat irregular anodes cast by customary means.

The anode bottom extension 20, also an insulator, functions to confine the bubble flow in the lower regions and to position the anode 30. The anode 30 is also maintained in position by the bottom rack 54. The bubbler itself is held in position below and adjacent to the cathode surface by the bubbler support member 56. With soluble anodes, it is generally not practical to secure an insulating extension to the anode bottom. In that event, the anode bottom may be inserted into the bottom rack, for which purpose the vertical members 54 are covered with insulating material. Alternatively, the insulating barriers 20 may be positioned in bottom rack 54 so that their upper edges are brought into contact with or in proximity to the bottom of the soluble anodes.

The principal incentive for electrowinning or electrorefining at high current density is the attendant reduction in plant size, metal inventory, and labor requirements. Further advantage is gained by elimination of several of the normal processing steps, including starter sheet production and short clearing. In order to take full advantage of electrodeposition at high current density, however, the process must (1) take place at currents which are much less than the limiting current density and (2) minimize the power consumption. The present invention presents a combination of factors which together accomplish these conditions by reducing the spacing of the electrodes and providing an agitation system which assures an adequate supply of metal ions to all parts of the cathode surface. The agitation has the additional benefit of mixing the electrolyte bath sufficiently to make it difficult for suspended particulate impurities to attach themselves to the faces of the cathode, thereby resulting in higher quality deposits.

Fine oxygen bubbles are formed at the insoluble anode during the electrowinning process. These fine bubbles reduce the concentration potential at the anode but are inadequate in providing mixing at the opposing cathode, even with close spacing of electrodes. The reason is that their small size causes them to drift ineffectively. Therefore, alternative agitation at the cathode is necessary, especially at high current densities, to bring about sufficient depolarization at the cathode. It has been found that gas agitation has the desirable characteristic in this invention of increasing the cathodic depolarization as the electrode spacing is decreased, at least within appropriate limits. With closely spaced commercial size electrodes, gas agitation may be the only efficient means of providing adequately good mass transport conditions over the entire faces of the cathodes in high current density operation.

The gas agitation system of the present invention induces an appreciable flow of electrolyte and maintains uniformity of electrolyte composition throughout an electrolytic cell of reasonable size. Indeed, the electrolyte composition is substantially the same, both within the cell and in the overflow.

The preferred configuration for the convection system is best shown in FIG. 9, where the bottom rack 54, the anode 30 and its bottom extension 20 and the anode edge baffles 18, together with the elongated cathode blank 22, form an enclosure which minimizes the lateral spreading or contraction of the sheet of bubbles. Other configurations of supporting members in the tank may be used to confine the bubble flow; however, it has been found that the above configuration is most effective and convenient in allowing ease of loading and unloading of cathodes and virtual elimination of shorts due to misalignment or warping and bowing.

Of course, other designs in bubbler tubes are possible. For example, gas bubbles may be pre-mixed into recirculating electrolyte and the mixture of bubbles and electrolyte introduced into the tank through a source located at the same approximate position as air bubbler tube 52 shown in the drawing. In this case, the dimensions of the bubbler may vary and the hole size be enlarged to permit the passage of the correct volume of recirculated electrolyte and volume of entrained gas.

The essential criterion for the gas agitation generator is that it introduce small bubbles from a line immediately adjacent to the cathode face to form a sheet of rapidly ascending bubbles that continue in a direction immediately adjacent to the cathode surface until reaching the electrolyte surface. The present invention has been applied to relatively pure electrolytes, such as are produced by liquid ion exchange extraction or are employed in starter sheet production, and to relatively impure electrolytes such as constitute electrorefining purge streams or as are produced by various processes of ore leaching.

The utility of the present invention becomes more manifest when dealing with impure electrolytes from which pure metal cannot normally be recovered at a low ratio of metal concentration to current density. In normal copper electrowinning from vat leach solution, for example, the lower limit for acceptable deposits is reached at a ratio of about 1.5 (grams Cu per liter/ASF) because of the increase in the electrolyte viscosity and the consequent decrease in the mass transport coefficient of cupric ions occasioned by the presence of extraneous solutes at appreciable concentration.

Features of the present invention (reduced electrode spacing, vigorous and uniform electrolyte agitation) allow the electrowinning process to be carried out economically at high current density which is still substantially below the limiting current density under the given mass transport conditions. The result is a very acceptable. Dense and coherent cathode products are obtained at ratios as low as 0.2 to 0.3 (g/l Cu/ASF), whatever the electrolyte composition. Further, the elimination of starting sheets and parting agents, through the use of non-retentive cathode blanks, and the control of current density distribution so as to obviate the need for blank edging has resulted in deposits of exceptional purity in all of their parts, including the edge regions. In particular, lead and sulfur impurities were held to as low as 0.1 ppm and less than 2.0 ppm, respectively.

The following examples may more clearly point out the extreme conditions of electrolyte impurity and low metal ion concentration under which high current density electrowinning may be employed using the present invention.

The numerical results for Examples 1 through 4 are given in Table I.

EXAMPLE 1

(Typical high acid, high current density electrowinning)

The cathode-anode spacing was fixed at about 1.26 inches. The copper and acid concentrations shown in Table I are those in the cell, not in the feed to the cell. The suspended matter was held at a minimum with continuous recirculation and filtration. The agitation was accomplished with the apparatus as shown in the drawings and with ⅜ inch O.D. stainless steel bubbler tubes with 0.020 inch wall thickness and 6 mil orifices at ½ inch intervals. Air was presaturated with water by sparging the air through heated water and supplied at about 1.0 SCFH per square foot of cathode. A copper starting sheet was used as the cathode in this trial, and a commercial lead/antimony anode was used.

The results as shown in Table I indicate a good deposit at 97% current efficiency even though copper concentration to current density ratio was approximately 0.7, a condition about twice as severe as in commercial copper electrowinning. Impurities levels were very low. The high current efficiency attained in this trial is typical of that obtained in the following examples.

EXAMPLE 2

(Effect of liquid ion exchange contaminants)

The electrolyte was deliberately saturated with a liquid ion exchange reagant and kerosene to simulate the contaminants which may enter the electrowinning tank from a prior process of liquid ion exchange. Furthermore, the contaminated electrolyte was not filtered, so as to avoid removal of entrained organic phase. The data from Table I indicates that the presence of the organic contaminants did not affect the results previously obtained. Copper concentration was here reduced to 29.5 g/l and current density remained at about 60 ASF. Electrolyte conductivity measured (for most high acid tests) about 0.54 mho/cm.

EXAMPLE 3

(Extreme current density)

Determination of the limit of current density to produce an acceptable quality cathode was accomplished using non-retentive Type 316 stainless steel cathodes in an electrolyte of intermediate copper concentration. The copper sheets were deposited to starter sheet thickness at a current density of 141 ASF in about 200 minutes. The deposits were ductile, although coarse-grained, and some areas had higher sulfur levels than previously found. The cell voltage and power consumption were reasonable for this current density, and the air agitation from the bubbler tube was increased to only 1.3 SCFH/sq. ft. of cathode surface.

EXAMPLE 4

(Porous (Air Roll) Bubbler)

Typical conditions of high current density (Example 3) were maintained while using a porous tube in place of the bubbler tube under each cathode. Excessive misting occurred at the electrolyte surface, and lead and sulfur impurities were higher than Example 3. The sweep pattern of the bubble stream was clearly visible on the deposit, resulting in non-uniformity of the cathode deposit. The stripping of the cathode deposit from the Type 316 stainless steel cathode blank was difficult due to the poor mechanical integrity of the deposit.

TABLE 1

| Example | 1 | 2 | 3 | 4 |
|---|---|---|---|---|
| Current density (ASF) | 59 | 60 | 141 | 139 |
| Electrode spacing (inches) | 1.26 | 1.06 | 1.04 | 0.75 |
| Cu concentration (g/l) | 42 g/l | 29.5 | 32 | 32 |
| Acid concentration (g/l) | 159 g/l | 172 | 171 | 171 |

TABLE 1-continued

| Example | 1 | 2 | 3 | 4 |
|---|---|---|---|---|
| Temperature (°F.) | 140 | 142 | 142 | 139 |
| Steady voltage (V) | 2.3 | 2.3 | 2.8 | 2.5 |
| Power consumption (kwh/lb Cu) | 0.91 | 0.89 | 1.07 | 0.97 |
| Cathode current efficiency (%) | 97 | 97 | 100 | 100 |
| Impurities | | | | |
| Lead (ppm) | 0.59 | 0.7 | 0.7 | 1.1,2.1 |
| Sulfur (ppm) | <3 | <2.5 | 4,32 | 7,22 |
| Slimes (mg/l) | 0.9 | 4.5 | 13 | 35 |

EXAMPLE 5

(Vat Leach Electrolyte)

The favorable results of the foregoing examples were obtained by electrowinning from a relatively pure electrolyte, such as that referred to as liquid ion exchange strip concentrate. In the leaching of ores, many extraneous solutes are extracted into the leach solution in addition to the desired metal values. Often, these extraneous solutes, including aluminum, magnesium and iron, are present in sufficient quantities to so degrade mass transport conditions that deposits of good quality are not obtained by direct electrowinning. Further, if reducible solutes such as ferric ion appear in the electrolyte in appreciable concentration, the current efficiency of metal deposition is decreased markedly.

By employing the methods and apparatus of the present invention, it has been possible to electrowin pure copper of acceptable mechanical integrity from impure vat leach electrolytes. Furthermore, the ratio of metal concentration to current density employed was many times smaller than in conventional practice, which generally produces an inferior product. By so operating, it was possible to take advantage of the improvement of current efficiency with increasing current density as revealed in the data of Table II. The solutions employed in these instances had aluminum, iron and magnesium each in the range of 10–20 g/l.

Table II

| Examples | 1 | 2 | 3 | 4 | 5 | 6 |
|---|---|---|---|---|---|---|
| Current density (ASF) | 20 | 30 | 40 | 30 | 40 | 60 |
| Electrode spacing (inches) | 2.3 | 2.3 | 2.3 | 1.05 | 1.23 | 1.23 |
| Cu concentration (g/l) | 20 | 20 | 20 | 10.3 | 10.4 | 10.6 |
| Acid concentration (g/l) | 49 | 49 | 49 | 63 | 64 | 63 |
| Temperature (°F.) | 140 | 125 | 140 | 148 | 139 | 141 |
| Cell voltage (V) | 2.7 | 3.2 | 3.8 | 2.4 | 2.9 | 4.0 |
| Power consumption (kwh/lb Cu) | 1.64 | 1.85 | 2.07 | 1.44 | 1.57 | 1.82 |
| Mechanical integrity | good | good | fair | good | fair | poor |
| Current efficiency (o/o) | 62 | 66 | 70 | 64 | 71 | 85 |

Although the previous examples deal with electrowinning, the present gas agitation system has been extensively tested under electrorefining conditions. Dense and mechanically sound copper deposits of high purity and superior appearance have been produced to starter sheet thickness on non-retentive blanks and also on copper blanks treated with a release agent. Heavier deposits of excellent quality and appearance, some up to 175 lbs. in weight per side, have been produced on starter sheets and on stainless steel and titanium blanks, as well as on other cathodic substrates. Anode passivation did not occur even at current densities as high as 300 ASF, and the deposits were uncontaminated by suspended anode slimes.

By using the system of the present invention, full size deposits were obtained which were equal or superior to typical electrorefined copper in terms of lead, sulfur, oxygen and other impurities. Cathode current efficiencies greater than 95% were obtained routinely when the electrolyte did not contain large amounts of reducible impurities. There are many advantages derived from following the teachings of the present invention. One advantage is that high acid electrolytes can be treated more effectively with the present invention. In connection with this point, it is well known in this art that conventional lead and lead alloy anodes corrode in high acid electrolytes (that is, electrolytes containing more than 100 g/l $H_2SO_4$). While the corrosion of conventional lead or lead alloy anodes is not prevented, the present invention avoids the incorporation into the electrowon deposits of products of corrosion of the insoluble anodes. Thus, although the invention is not limited to high acid electrolytes or anodes containing lead, particular advantage is derived from practicing the invention in this type of environment.

Another advantage derived from following the teachings of the present invention is that electrolytes containing low amounts of copper can be economically treated. In connection with this point, the ratio of current density in amps per square foot to copper concentration in grams per liter can be as great as 5 in the present system, as compared to 0.5 in conventional commercial practice.

Although lead-antimony anodes have been disclosed, it is apparent to those skilled in this art that anodes of any suitable material can be employed. By way of example and not by way of limitation, other anodes that are useable in the present invention include lead or lead alloy anodes, titanium coated with precious metal oxides, or graphite. Indeed, for the electrowinning embodiment of the present invention any insoluble or "dimensionally stable" anode can be used. Of course, in electrorefining, soluble anodes of the metal to be refined are used.

Although non-retentive cathode blanks are preferred, any cathodic substrate can be employed in the present invention, including starter sheets such as copper starter sheets and blanks coated with release agents.

One of the most significant advantages of the present system is that high current density can be effectively employed while still obtaining a high quality product. Indeed, excellent results are obtainable in the present invention with current density as high as 300 ASF, depending upon the temperature and the composition of the electrolyte. In connection with the term high current density, a current density of around 40 ASF would be considered high by those skilled in this art; thus, the invention can be used to great advantage with current densities between 40–300 ASF with normal metal concentration in the electrolyte.

Another significant advantage of the system of the present invention is that the face to face separation of the anode-cathode can be decreased to a value which is limited only by the dimensions of the supporting means. In connection with this point it is well known that to keep power costs at a minimum, the resistance in the cell should be decreased. Three ways to accomplish the foregoing are to increase the temperature, increase the concentration of conducting solutes in the electrolyte and reduce the spacing between electrodes. However, in prior art processes, reduced spacing creates other serious problems, particularly by restricting convection. With a properly designed gas agitation system, in distinction to the prior art, the smaller the spacing between opposing cathode and anode faces, the better is the convection. As was stated above, the reduction in spacing is limited by the suspension means; thus, as a practical matter, the spacing can not usually be made less than about 0.50 inch. In conventional practice, the face to face cathode-anode separation is usually not less than 1.25 inch.

Of course, as is apparent to those skilled in this art, the invention is not restricted to the electrodeposition of copper. Indeed, the process and apparatus can be employed to great advantage for treating any metal which is normally electrodeposited from aqueous solution. Such metals include nickel, zinc and lead.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

We claim:

1. A method of performing electrodeposition at a high ratio of current density to metal ion concentration in a cell which includes anodes, cathodes and an electrolyte with an attendant production of high quality metal which can be easily stripped from the cathodes comprising the following steps:

a. positioning non-conductive convection edge baffles adjacent to opposite edges of the anode faces so as to extend toward the cathode faces;
b. positioning non-conductive anode bottom extensions beneath the anodes;
c. providing cathodes that are wider than the anodes so that the edges of the cathodes extend outwardly from the convection edge baffles;
d. submerging the cathodes so that the submerged length of the cathodes are equal to or greater than the submerged length of the anodes and the anode bottom extensions;
e. positioning bubble tubes having orifices between the non-conductive anode extensions and the cathode faces;
f. spacing opposed anode and cathode faces apart from each other at a distance of about 1¼ inches or less; and,
g. electrodepositing metal on the cathodes while generating a sheet of gas bubbles from the bubble tubes through the electrolyte between opposed anode-cathode faces to produce agitation of the electrolyte over the cathode faces as metal is being deposited thereon and maintaining said convection edge baffles during electrodeposition to form enclosures between cathode and anode faces to minimize lateral spreading and contraction of the sheet of bubbles and prevent deposition of metal at the edges of the cathodes extending beyond the baffles, and maintaining said anode bottom extension during electrodeposition to prevent deposition of metal at the bottom of the cathode faces.

2. The method as set forth in claim 1 wherein the sheet of air bubbles is saturated with water vapor and generated through a perforated bubble tube.

3. The method as set forth in claim 2 wherein clamps are positioned on cathode suspension bars to reduce resistance of the current connection.

4. The method as set forth in claim 1 wherein clamps are positioned on anode suspension bars to reduce electrical resistance of the current connection.

5. The method as set forth in claim 1 wherein the convection edge baffles are attached to the walls of the cell.

6. The method as set forth in claim 1 wherein the convection edge baffles are positioned on vertical support members on the walls of the cell.

7. A method of electrowinning a metal at a high ratio of current density to metal ion concentration in a cell which includes insoluble anodes, cathodes and an electrolyte with an attendant production of high quality metal which can be easily stripped from the cathodes comprising the following steps:

a. attaching non-conductive convection edge baffles to opposite edges of the anode faces so as to extend toward the cathode faces;
b. attaching non-conductive anode bottom extensions the anodes;
c. providing cathodes that are wider than the anodes so that the edges of the cathodes extend outwardly from the convection edge baffles;
d. submerging the cathodes so that the submerged length of the cathodes are equal to or greater than the submerged length of the anodes and the anode bottom extensions;
e. positioning bubble tubes having orifices between the non-conductive anode extensions and the cathode faces;
f. spacing opposed anode and cathode faces apart from each other at a distance of about 1¼ inches or less; and,
g. electrodepositing metal on the cathodes while generating a sheet of gas bubbles from the bubble tubes through the electrolyte between opposed anode-cathode faces to produce agitation of the electrolyte over the cathode faces as metal is being deposited thereon and maintaining said convection edge baffles during electrodeposition to form enclosures between cathode and anode faces to minimize lateral spreading and contraction of the sheet of bubbles and prevent deposition of metal at the edges of the cathodes extending beyond the baffles, and maintaining said anode bottom extension during electrodeposition to prevent deposition of metal at the bottom of the cathode faces.

8. The method as set forth in claim 7 wherein the electrodepositing is performed at a current density between the range of 40–300 ASF.

9. The method as set forth in claim 8 wherein step (f) opposed anode and cathode faces are spaced apart a distance of less than 1 inch from each other.

10. The method as set forth in claim 9 wherein copper is electrodeposited on the cathode.

11. The method as set forth in claim 8 wherein a non-retentive cathode is provided.

12. The method as set forth in claim 11 wherein copper is electrodeposited on the cathode.

13. The method as set forth in claim 8 wherein copper is electrodeposited on the cathode.

*14. A method of performing electrodeposition at a high ratio of current density to metal ion concentration in a cell which includes anodes, cathodes and an electrolyte with an attendant production of high quality metal which can be easily stripped from the cathodes comprising the following steps:*

*a. positioning non-conductive convection edge baffles adjacent to opposite edges of the anode faces so as to extend toward the cathode faces;*

*b. positioning non-conductive anode bottom extensions beneath the anodes;*

*c. providing cathodes that are wider than the anodes so that the edges of the cathodes extend outwardly from the convection edge baffles;*

*d. submerging the cathodes so that the submerged length of the cathodes is sufficiently greater than the submerged length of the anodes so that metal does not deposit at the bottom of the cathode faces;*

*e. positioning bubble tubes having orifices between the non-conductive anode extensions and the cathode faces;*

*f. spacing opposed anode and cathode faces apart from each other at a distance of about 1¼ inches or less; and,*

*g. electrodepositing metal on the cathodes while generating a sheet of gas bubbles from the bubble tubes through the electrolyte between opposed anode-cathode faces to produce agitation of the electrolyte over the cathode faces as metal is being deposited thereon and maintaining said convection edge baffles during electrodeposition to form enclosures between cathode and anode faces to minimize lateral spreading and contraction of the sheet of bubbles and prevent deposition of metal at the edges of the cathodes extending beyond the baffles, and maintaining said anode bottom extension during electrodeposition to prevent deposition of metal at the bottom of the cathode faces.*

*15. The method as set forth in claim 14 wherein the sheet of air bubbles is saturated with water vapor and generated through a perforated bubble tube.*

*16. The method as set forth in claim 15 wherein clamps are positioned on cathode suspension bars to reduce resistance of the current connection.*

*17. The method as set forth in claim 14 wherein clamps are positioned on anode suspension bars to reduce electrical resistance of the current connection.*

*18. The method as set forth in claim 14 wherein the convection edge baffles are attached to the walls of the cells.*

*19. The method as set forth in claim 14 wherein the convection edge baffles are positioned on vertical support members on the walls of the cells.*

*20. A method of electrowinning a metal at a high ratio of current density to metal ion concentration in a cell which includes insoluble anodes, cathodes and an electrolyte with an attendant production of high quality metal which can be easily stripped from the cathodes comprising the following steps:*

*a. attaching non-conductive convection edge baffles to opposite edges of the anode faces so as to extend toward the cathode faces;*

*b. attaching non-conductive anode bottom extensions beneath the anodes;*

*c. providing cathodes that are wider than the anodes so that the edges of the cathodes extend outwardly from the convection edge baffles;*

*d. submerging the cathodes so that the submerged length of the cathodes is sufficiently greater than the submerged length of the anodes so that metal does not deposit at the bottom of the cathode faces;*

*e. positioning bubble tubes having orifices between the non-conductive anode extensions and the cathode faces;*

*f. spacing opposed anode and cathode faces apart from each other at a distance of about 1¼ inches or less; and,*

*g. electrodepositing metal on the cathodes while generating a sheet of gas bubbles from the bubble tubes through the electrolyte between opposed anode-cathode faces to produce agitation of the electrolyte over the cathode faces as metal is being deposited thereon and maintaining said convection edge baffles during electrodeposition to form enclosures between cathode and anode faces to minimize lateral spreading and contraction of the sheet of bubbles and prevent deposition of metal at the edges of the cathodes extending beyond the baffles, and maintaining said anode bottom extension during electrodeposition to prevent deposition of metal at the bottom of the cathode faces.*

*21. The method as set forth in claim 20 wherein the electrodepositing is performed at a current density between the range of 40–300 ASF.*

*22. The method as set forth in claim 21 wherein step (f) opposed anode and cathode faces are spaced apart a distance of less than 1 inch from each other.*

*23. The method as set forth in claim 22 wherein copper is electrodeposited on the cathode.*

*24. The method as set forth in claim 21 wherein a non-retentive cathode is provided.*

*25. The method as set forth in claim 24 wherein copper is electrodeposited on the cathode.*

*26. The method as set forth in claim 21 wherein copper is electrodeposited on the cathode.*

* * * * *